US012361892B2

(12) United States Patent
Byun et al.

(10) Patent No.: US 12,361,892 B2
(45) Date of Patent: Jul. 15, 2025

(54) DISPLAY DEVICE AND METHOD OF DRIVING THE SAME

(71) Applicant: Samsung Display Co., LTD., Yongin-si (KR)

(72) Inventors: Min Woo Byun, Yongin-si (KR); Won Kyu Kwak, Yongin-si (KR); Seon I Jeong, Yongin-si (KR); Min Joo Kim, Yongin-si (KR); Dong Hwan Jeon, Yongin-si (KR); Sung Chan Hwang, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/424,582

(22) Filed: Jan. 26, 2024

(65) Prior Publication Data

US 2024/0347007 A1 Oct. 17, 2024

(30) Foreign Application Priority Data

Apr. 14, 2023 (KR) ........................ 10-2023-0049629
Apr. 19, 2023 (KR) ........................ 10-2023-0051630

(51) Int. Cl.
*G09G 3/3266* (2016.01)
*G09G 3/3291* (2016.01)

(52) U.S. Cl.
CPC ......... *G09G 3/3266* (2013.01); *G09G 3/3291* (2013.01); *G09G 2330/021* (2013.01)

(58) Field of Classification Search
CPC ... G09G 3/3266; G09G 3/3291; G09G 3/3233
See application file for complete search history.

(56) References Cited

U.S. PATENT DOCUMENTS

| | | | | |
|---|---|---|---|---|
| 9,305,494 | B2 | 4/2016 | Shim et al. | |
| 9,549,439 | B2 | 1/2017 | Lee et al. | |
| 10,127,859 | B2 | 11/2018 | Chang et al. | |
| 10,510,302 | B2 * | 12/2019 | Yoo | G09G 3/3233 |
| 11,056,060 | B2 | 7/2021 | Kim et al. | |

(Continued)

FOREIGN PATENT DOCUMENTS

| | | |
|---|---|---|
| KR | 10-2015-0077710 A | 7/2015 |
| KR | 10-2018-0078109 A | 7/2018 |

(Continued)

*Primary Examiner* — Sardis F Azongha

(74) *Attorney, Agent, or Firm* — Womble Bond Dickinson (US) LLP

(57) ABSTRACT

A display device may include a pixel that includes a first transistor, a second transistor including a gate electrode coupled to a first scan line, and first and second electrodes, a third transistor including a gate electrode coupled to a second scan line, and first and second electrodes, a fourth transistor including a gate electrode coupled to a third scan line, and first and second electrodes, a fifth transistor including a gate electrode coupled to a fourth scan line, and first and second electrodes, a sixth transistor including a gate electrode coupled to a fifth scan line, and first and second electrodes, and a first capacitor. The display device may be, during a first period of a frame period, to concurrently apply a turn-on level scan signal to the third scan line, and apply turn-off level scan signals to the first, second, fourth and fifth scan lines.

18 Claims, 13 Drawing Sheets

(56) References Cited

U.S. PATENT DOCUMENTS

| | | | | |
|---|---|---|---|---|
| 11,295,669 | B2 | 4/2022 | Wang et al. | |
| 11,404,003 | B2 | 8/2022 | Jeong et al. | |
| 11,600,226 | B2 | 3/2023 | Hwang | |
| 2019/0180688 | A1* | 6/2019 | Yang | G09G 3/3233 |
| 2021/0327350 | A1* | 10/2021 | Nam | G09G 3/3233 |
| 2022/0173189 | A1 | 6/2022 | Kim et al. | |
| 2022/0284860 | A1* | 9/2022 | Lin | G09G 3/3266 |
| 2022/0366849 | A1* | 11/2022 | Lee | H10K 59/124 |
| 2023/0009113 | A1 | 1/2023 | Son et al. | |
| 2023/0360590 | A1 | 11/2023 | Jeong et al. | |

FOREIGN PATENT DOCUMENTS

| | | | |
|---|---|---|---|
| KR | 10-2020-0142646 | A | 12/2020 |
| KR | 10-2208862 | B1 | 1/2021 |
| KR | 10-2021-0114578 | A | 9/2021 |
| KR | 10-2022-0014366 | A | 2/2022 |
| KR | 10-2022-0016346 | A | 2/2022 |
| KR | 10-2022-0068778 | A | 5/2022 |
| KR | 10-2022-0076872 | A | 6/2022 |
| KR | 10-2453259 | B1 | 10/2022 |
| KR | 10-2473223 | B1 | 12/2022 |
| KR | 10-2481292 | B1 | 12/2022 |
| KR | 10-2023-0009249 | A | 1/2023 |
| KR | 10-2023-0034469 | A | 3/2023 |
| WO | WO 2019/199021 | A1 | 10/2019 |

* cited by examiner

P1: t9a~t10a
P2: t3a~t4a
P3: t5a~t6a
P4: t7a~t8a

DISPLAY DEVICE AND METHOD OF DRIVING THE SAME

CROSS-REFERENCE TO RELATED APPLICATION

The present application claims priority to and the benefit of Korean Patent Application No. 10-2023-0049629, filed on Apr. 14, 2023, and Korean Patent Application No. 10-2023-0051630, filed on Apr. 19, 2023, in the Korean Intellectual Property Office, the entire disclosure of each of which is incorporated herein by reference.

BACKGROUND

1. Field

Various embodiments of the present disclosure relate to a display device and a method of driving the same.

2. Description of Related Art

With the development of information technology, the importance of a display device, which is a connection medium between a user and information, has increased. Owing to the importance of display devices, the use of various kinds of display devices, such as a liquid crystal display devices and an organic light-emitting display devices, has increased.

The display devices may display an image using a pixel component including a plurality of pixels. Pixel circuits of the pixels may incur unnecessary power consumption depending on the structure.

SUMMARY

Various embodiments of the present disclosure are directed to a display device capable of minimizing or reducing power consumption, and a method of driving the display device.

One or more embodiments of the present disclosure may provide a display device including a pixel component including a plurality of pixels, wherein a pixel of the plurality of pixels includes a first transistor including a first gate electrode coupled to a first node, and a second gate electrode coupled to a second node, a second transistor including a gate electrode coupled to a first scan line, a first electrode coupled to a data line, and a second electrode coupled to the first node, a third transistor including a gate electrode coupled to a second scan line, a first electrode configured to receive a reference voltage, and a second electrode coupled to the first node, a fourth transistor including a gate electrode coupled to a third scan line, a first electrode configured to receive an initialization voltage, and a second electrode coupled to a third node, a fifth transistor including a gate electrode coupled to a fourth scan line, a first electrode coupled to a first power line, and a second electrode coupled to a first electrode of the first transistor, a sixth transistor including a gate electrode coupled to a fifth scan line, a first electrode coupled to the second node, and a second electrode coupled to the third node, and a first capacitor between the first node and the second node, wherein, during a first period of a frame period, the display device is configured to concurrently apply a scan signal of a turn-on level to the third scan line, and apply scan signals of a turn-off level to the first scan line, the second scan line, the fourth scan line, and the fifth scan line.

After the first period, the display device may be configured to sequentially apply a scan signal of a turn-on level to the fourth scan line and a scan signal of a turn-on level to the fifth scan line.

The pixel component may be configured to display an image at a first frequency in a first mode, and to display an image at a second frequency that is less than the first frequency in a second mode, wherein, in the first mode, each frame period includes a first scan period during which a data voltage is written to the pixel, and a second scan period during which the data voltage is not written to the pixel, and wherein, in the second mode, each frame period includes the first scan period and a plurality of the second scan periods.

The first scan period may include the first period, and a second period during which scan signals of a turn-off level are applied to the first scan line and the fourth scan line, and scan signals of a turn-on level are applied to the second scan line, the third scan line, and the fifth scan line.

The first scan period may further include a third period during which scan signals of a turn-off level are applied to the first scan line, the third scan line, and the fifth scan line, and scan signals of a turn-on level are applied to the second scan line and the fourth scan line.

The first scan period may further include a fourth period during which a scan signal of a turn-on level is applied to the first scan line, and scan signals of a turn-off level are applied to the second scan line, the third scan line, the fourth scan line, and the fifth scan line.

The second period, the third period, the fourth period, and the first period may occur sequentially in the first scan period.

The second scan period may include a fifth period during which, while a scan signal of a turn-on level is applied to the third scan line, scan signals of a turn-off level are applied to the first scan line, the second scan line, the fourth scan line, and the fifth scan line.

After the fifth period, the display device may be configured to sequentially apply a scan signal of a turn-on level to the fourth scan line and a scan signal of a turn-on level to the fifth scan line.

The second scan period may further include a sixth period during which, while a scan signal of a turn-on level is applied to the third scan line, scan signals of a turn-off level are applied to the first scan line, the second scan line, the fourth scan line, and the fifth scan line.

The sixth period and the fifth period may occur sequentially in the second scan period.

Before the sixth period, the display device may be configured to apply scan signals of a turn-off level to the fourth scan line and the fifth scan line.

One or more embodiments of the present disclosure may provide a method of driving a display device, the method including displaying an image at a first frequency in a first mode, and displaying an image at a second frequency that is less than the first frequency in a second mode, wherein, in the first mode, each frame period includes a first scan period during which a data voltage is written to a pixel, and a second scan period during which the data voltage is not written to the pixel, and wherein, in the second mode, each frame period includes the first scan period and a plurality of the second scan periods, wherein, in the first scan period, the method of driving the display device sequentially includes coupling a first end of a first capacitor in the pixel and an anode of a light-emitting element to a same initialization voltage source, increasing a voltage of the first end of the first capacitor to correspond to a threshold voltage of a driving transistor in the pixel, applying a data voltage to a second end of the first capacitor, and coupling the anode of the light-emitting element to the initialization voltage source while the first end of the first capacitor remains electrically disconnected from the initialization voltage source.

In the first scan period, the method may further include coupling the driving transistor to a first power line, and coupling the driving transistor to the anode of the light-emitting element.

A duration of the coupling of the first end of the first capacitor and the anode of the light-emitting element to the same initialization voltage source may be longer than a duration of the coupling of the anode of the light-emitting element to the initialization voltage source while the first end of the first capacitor remains electrically disconnected from the initialization voltage source.

A duration of the increasing of the voltage of the first end of the first capacitor may be longer than a duration of the coupling of the first end of the first capacitor and the anode of the light-emitting element to the same initialization voltage source.

A duration of the applying of the data voltage to the second end of the first capacitor may be shorter than a duration of the coupling of the anode of the light-emitting element to the initialization voltage source while the first end of the first capacitor remains disconnected from the initialization voltage source.

In the second scan period, the method may further include a first operation of coupling the anode of the light-emitting element to the initialization voltage source while the first end of the first capacitor remains disconnected from the initialization voltage source, and a second operation of coupling the anode of the light-emitting element to the initialization voltage source while the first end of the first capacitor remains disconnected from the initialization voltage source, wherein a duration of the first operation is longer than a duration of the second operation.

In the second scan period, the method may further include coupling the driving transistor to a first power line after the second operation, and coupling the driving transistor to an anode of the light-emitting element.

In the second scan period, the method may further include concurrently disconnecting a connection between a first power line and the driving transistor, and disconnecting a connection between the driving transistor and the anode of the light-emitting element, coupling only the anode of the light-emitting element to the initialization voltage source while the first end of the first capacitor remains disconnected from the initialization voltage source, coupling the driving transistor to the first power line, and coupling the driving transistor to the anode of the light-emitting element.

DETAILED DESCRIPTION

Figure 1:
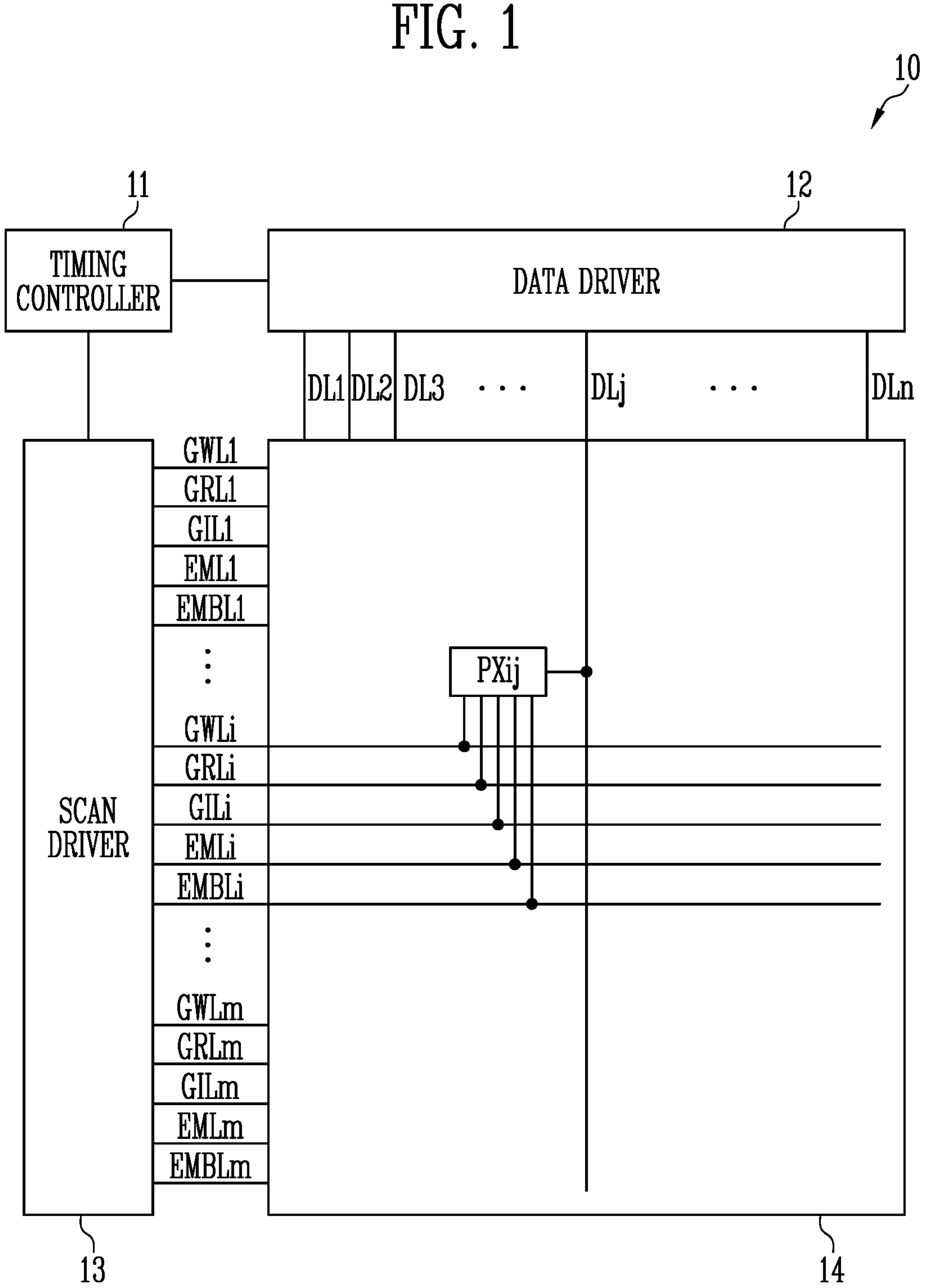
FIG. 1 is a diagram for describing a display device in accordance with one or more embodiments of the present disclosure.

Hereinafter, embodiments of the present disclosure will be described in more detail with reference to the drawings, such that those skilled in the art can easily implement the present disclosure. The present disclosure may be implemented in various suitable forms, and is not limited to the embodiments to be described herein below.

In the drawings, portions that may not be related to the present disclosure may be omitted to explain the present disclosure more clearly. Reference should be made to the drawings, in which similar reference numerals are used throughout the different drawings to designate similar components. Therefore, the aforementioned reference numerals may be used in other drawings.

For reference, the size of each component and the thicknesses of lines illustrating the component may be arbitrarily represented for the sake of explanation, and the present disclosure is not limited to what is illustrated in the drawings. In the drawings, the thicknesses of the components may be exaggerated to clearly depict multiple layers and areas.

Furthermore, the expression "being the same" may mean "being substantially the same." For example, the expression "being the same" may include a range that can be tolerated as recognized by those skilled in the art. Other expressions may also be expressions from which "substantially" has been omitted.

It will be understood that, although the terms "first," "second," "third," etc., may be used herein to describe various elements, components, regions, layers, and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section, without departing from the spirit and scope of the present disclosure.

Spatially relative terms, such as "beneath," "below," "lower," "under," "above," "upper" and the like, may be used herein for ease of description to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the present disclosure. As used herein, the singular forms "a," "an," and "the" are intended to include the plural forms as well, unless the context clearly indicates otherwise. It will be further understood that the terms "comprises," "comprising," "includes," and "including," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the present disclosure refers to "one or more embodiments of the present disclosure."

It will be understood that when an element or layer is referred to as being "on," "connected to," "coupled to," or "adjacent to" another element or layer, it can be directly on, connected to, coupled to, or adjacent to the other element or layer, or one or more intervening element(s) or layer(s) may be present. In contrast, when an element or layer is referred to as being "directly on," "directly connected to," "directly coupled to," or "immediately adjacent to" another element or layer, there are no intervening elements or layers present.

As used herein, the term "substantially" and similar terms are used as terms of approximation and not as terms of degree, and are intended to account for the inherent deviations in measured or calculated values that would be recognized by those of ordinary skill in the art.

FIG. 1 is a diagram for describing a display device 10 in accordance with one or more embodiments of the present disclosure.

Referring to FIG. 1, the display device 10 in accordance with one or more embodiments of the present disclosure may include a timing controller 11, a data driver 12, a scan driver 13, and a pixel component 14.

The timing controller 11 may receive grayscale signals for an image (or a frame). The grayscale signals may include a first color grayscale signal, a second color grayscale signal, and a third color grayscale signal. The first color grayscale signal may be a grayscale signal for expressing a first color. The second color grayscale signal may be a grayscale signal for expressing a second color. The third color grayscale signal may be a grayscale signal for expressing a third color.

Furthermore, the timing controller 11 may receive a control signal for an image. The control signal may include a horizontal synchronization signal (Hsync), a vertical synchronization signal (Vsync), and a data enable signal. The vertical synchronization signal may include a plurality of pulses and indicate that a previous frame period ends and a current frame period starts based on a time point at which each pulse occurs. A distance between adjacent pulses of the vertical synchronization signal may correspond to one frame period. The horizontal synchronization signal may include a plurality of pulses, and may indicate that a previous horizontal period ends and a new horizontal period starts based on a time point at which each pulse occurs. A distance between adjacent pulses of the horizontal synchronization signal may correspond to one horizontal period. The data enable signal may have an enable level in corresponding horizontal periods, and may have a disable level in the other periods. The data enable signal having an enable level may indicate that color grayscale signals are supplied in corresponding horizontal periods.

The timing controller 11 may provide, to the data driver 12, grayscale signals rendered or corrected to meet the specifications of the display device 10. Furthermore, the timing controller 11 may provide a clock signal, a scan start signal, and the like to the scan driver 13.

The data driver 12 may generate data voltages to be provided to data lines DL1, DL2, DL3, . . . , DLj, . . . , and DLn using grayscale signals and control signals that are received from the timing controller 11. For example, the data driver 12 may sample the grayscale signals using a clock signal, and may apply data voltages corresponding to the grayscale signals to the data lines DL1 to DLn on a pixel row basis. Here, n is an integer greater than 0. The term "pixel row" refers to pixels that are coupled (e.g., connected) to the same scan line.

The scan driver 13 may receive a clock signal, a scan start signal, and the like from the timing controller 11, and may generate scan signals to be provided to the scan lines GWL1, GRL1, GIL1, EML1, EMBL1, . . . , GWLi, GRLi, GILi, EMLi, EMBLi, . . . , GWLm, GRLm, GILm, EMLm, and EMBLm. Here, m is an integer greater than 0. For example, the scan driver 13 may include a first sub-scan driver coupled (e.g., connected) to the first scan lines GWL1, . . . , GWLi, . . . , and GWLm, a second sub-scan driver coupled (e.g., connected) to the second scan lines GRL1, . . . , GRLi, . . . , and GRLm, a third sub-scan driver coupled (e.g., connected) to the third scan lines GIL1, . . . , GILi, . . . , and GILm, a fourth sub-scan driver coupled (e.g., connected) to the fourth scan lines EML1, . . . , EMLi, . . . , and EMLm, and a fifth sub-scan driver coupled (e.g., connected) to the fifth scan lines EMBL1, . . . , EMBLi, . . . , and EMBLm.

For example, the first sub-scan driver may sequentially supply scan signals each having a turn-on level pulse to the first scan lines GWL1 to GWLm. For instance, the first sub-scan driver may be configured in the form of a shift register, and may generate scan signals in such a way that a pulse-type scan start signal of a turn-on level is sequentially transmitted to a subsequent stage circuit according to the control of a clock signal. The second to fifth sub-scan drivers may also be implemented in the same manner, so that redundant explanation thereof may not be repeated.

The pixel component 14 includes pixels. Each pixel PXij may be coupled (e.g., connected) to a corresponding data line, a corresponding scan line, and an emission line. Here, i and j each may be an integer greater than 0. The pixel PXij may refer to a pixel that is coupled (e.g., connected) to an i-th scan line and a j-th data line.

The pixel component 14 may include first pixels configured to emit a first color of light, second pixels configured to emit a second color of light, and third pixels configured to emit a third color of light. The first color, the second color, and the third color may be different respective colors. For example, the first color may be one of red, green, or blue. The second color may be one of red, green, or blue, other than the first color. The third color may be the remaining color among the red, green, and blue, other than the first color and the second color. In one or more embodiments, magenta, cyan, and yellow, in lieu of red, green, and blue, may be used as the first to third colors.

The pixel component 14 may have various suitable pixel arrangement structures, such as a diamond PENTILE® (PENTILE being a Trademark of Samsung Display Co., Ltd.) structure, an RGB-stripe structure, an S-stripe structure, a real RGB structure, and a normal PENTILE® structure. For example, the pixels of the pixel component 14 may be arranged in a RGBG matrix structure.

Figure 2:
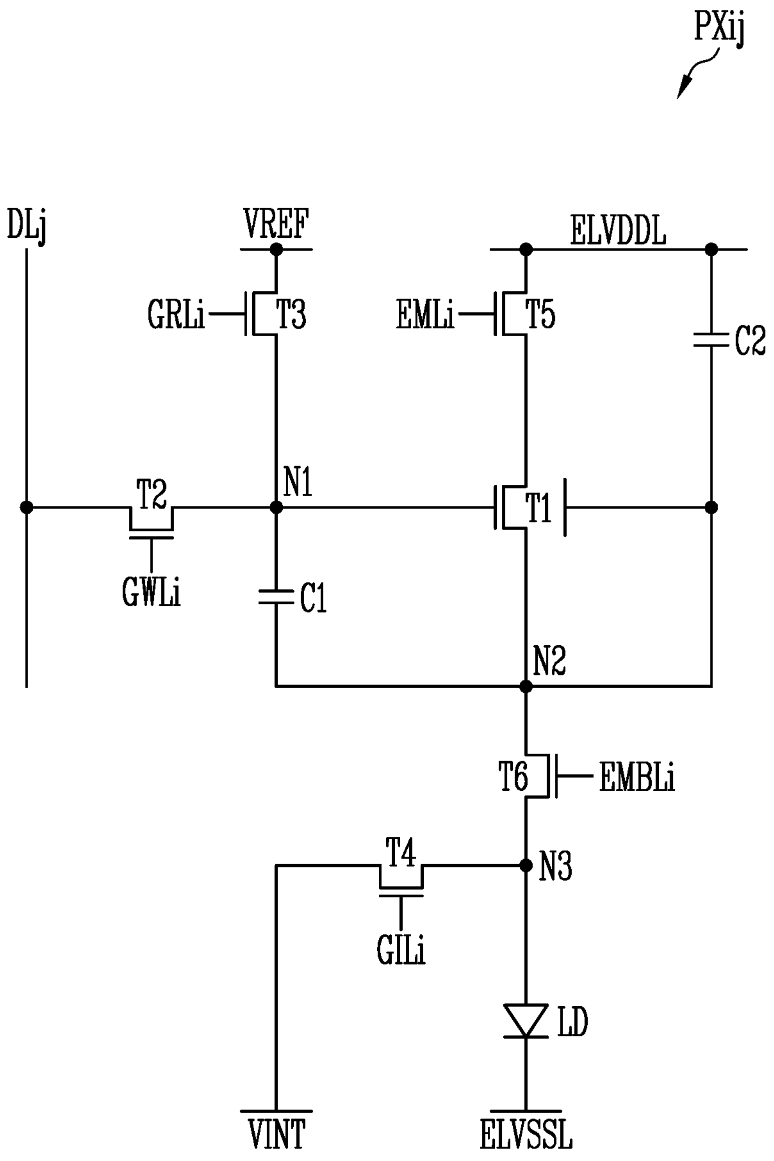
FIG. 2 is a diagram for describing a pixel in accordance with one or more embodiments of the present disclosure.

FIG. 2 is a diagram for describing a pixel PXij in accordance with one or more embodiments of the present disclosure.

Referring to FIG. 2, the pixel PXij in accordance with one or more embodiments of the present disclosure includes transistors T1, T2, T3, T4, T5, and T6, a first capacitor C1, a second capacitor C2, and a light-emitting diode LD.

Hereinafter, a circuit configured of N-type transistors will be described by way of example. However, those skilled in the art may design a circuit configured of P-type transistors by changing the polarity of the voltage to be applied to a gate terminal of each transistor. Likewise, those skilled in this art may design a circuit configured of a combination of a P-type transistor and an N-type transistor. The term "P-type transistor" is a general name for transistors in which the amount of current increases if a voltage difference between a gate electrode and a source electrode increases in a negative direction. The term "N-type transistor" is a general name for transistors in which the amount of current increases if a voltage difference between a gate electrode and a source electrode increases in a positive direction. Each transistor may be configured in various suitable forms, such as a thin film transistor (TFT), a field effect transistor (FET), and a bipolar junction transistor (BJT).

The following description assumes that the transistors T1, T2, T3, T4, T5, and T6 are configured of N-type oxide thin-film transistors. In one or more embodiments, the transistors T1, T2, T3, T4, T5, and T6 may be formed of P-type transistors. In one or more embodiments, one or more transistors of the transistors T1, T2, T3, T4, T5, and T6 may be formed of N-type oxide thin-film transistors, and one or more other transistors of the transistors T1, T2, T3, T4, T5, and T6 may be formed of P-type silicon thin-film transistors.

An oxide thin-film transistor may correspond to a low temperature polycrystalline oxide (LTPO) thin-film transistor in which an active pattern (a semiconductor layer) includes (e.g., is) oxide. However, this is only for illustrative purposes, and the N-type transistors are not limited thereto. For example, an active pattern (or a semiconductor layer) included in the N-type transistor may include (e.g., may be) an inorganic semiconductor (e.g., amorphous silicon, poly silicon) or an organic semiconductor. The silicon thin-film transistor may correspond to a low temperature polycrystalline silicon (LTPS) thin-film transistor in which the active pattern (or the semiconductor layer) includes (e.g., is) amorphous silicon, poly silicon, and/or the like.

The first transistor T1 may include a first gate electrode coupled (e.g., connected) to a first node N1, and a second gate electrode coupled (e.g., connected) to a second node N2. The second gate electrode of the first transistor T1 may be provided to adjust characteristics of output current relative to an input voltage of the first transistor T1. For example, the first transistor T1 primarily operates in a saturation state. Here, if the second gate of the first transistor T1 is not present, the magnitude of the output current may vary depending on changes in a drain-source voltage, even though a gate-source voltage remains the same. As the characteristics of the first transistor T1 are adjusted to be insensitive to changes in the drain-source voltage, it is possible for the first transistor T1 to output substantially identical current for the same gate-source voltage. The first transistor T1 may control driving current flowing from a first power line ELVDDL to a second power line ELVSSL. Therefore, the first transistor T1 may be referred to as "driving transistor." The first transistor T1 may include a first electrode coupled (e.g., connected) to a second electrode of the fifth transistor T5, and a second electrode coupled (e.g., connected) to the second node N2.

The second transistor T2 may include a gate electrode coupled (e.g., connected) to the first scan line GWLi, a first electrode coupled (e.g., connected) to the data line DLj, and a second electrode coupled (e.g., connected) to the first node N1. The second transistor T2 may receive a data voltage applied to the data line DLj. Therefore, the second transistor T2 may be referred to as "data write transistor."

The third transistor T3 may include a gate electrode coupled (e.g., connected) to the second scan line GRLi, a first electrode configured to receive a reference voltage VREF, and a second electrode coupled (e.g., connected) to the first node N1. The reference voltage VREF may be supplied from a reference voltage source. The third transistor T3 may apply the reference voltage VREF to the first node N1 to initialize the voltage of the first node N1 to the reference voltage VREF. Therefore, the third transistor T3 may be referred to as "first initialization transistor."

The fourth transistor T4 may include a gate electrode coupled (e.g., connected) to the third scan line GILi, a first electrode configured to receive an initialization voltage VINT, and a second electrode coupled (e.g., connected) to a third node N3. The initialization voltage VINT may be supplied from an initialization voltage source. The fourth transistor T4 may apply the initialization voltage VINT to the third node N3 to initialize the voltage of the third node N3 to the initialization voltage VINT. Therefore, the fourth transistor T4 may be referred to as "second initialization transistor."

The fifth transistor T5 may include a gate electrode coupled (e.g., connected) to the fourth scan line EMLi, a first electrode coupled (e.g., connected) to the first power line ELVDDL, and the second electrode coupled (e.g., connected) to the first electrode of the first transistor T1. The fifth transistor T5 may control opening and closing of a driving current path coupling (e.g., connecting) the first power line ELVDDL to the second power line ELVSSL. Therefore, the fifth transistor T5 may be referred to as "first emission control transistor."

The sixth transistor T6 may include a gate electrode coupled (e.g., connected) to the fifth scan line EMBLi, a first electrode coupled (e.g., connected) to the second node N2, and a second electrode coupled (e.g., connected) to the third node N3. The sixth transistor T6 may control opening and closing of the driving current path coupling (e.g., connecting) the first power line ELVDDL to the second power line ELVSSL. Therefore, the sixth transistor T6 may be referred to as "second emission control transistor."

The first capacitor C1 may connect, or capacitively couple, the first node N1 to the second node N2. The second capacitor C2 may connect, or capacitively couple, the first power line ELVDDL to the second node N2.

The light-emitting diode LD may include an anode coupled (e.g., connected) to the third node N3, and a cathode coupled (e.g., connected) to the second power line ELVSSL. The light-emitting element LD may be a light-emitting diode. The light-emitting element LD may be formed of an organic light-emitting diode, an inorganic light-emitting diode, a quantum dot/well light-emitting diode, and/or the like. Although only one light-emitting element LD is provided in each pixel according to one or more embodiments, a plurality of light-emitting elements may be provided in each pixel in one or more other embodiments. Here, the plurality of light-emitting elements may be coupled (e.g., connected) in series, parallel, or series-parallel to each other. The light-emitting element LD of each pixel may emit light having one of a first color, a second color, or a third color.

A first power voltage may be applied to the first power line ELVDDL. A second power voltage may be applied to the second power line ELVSSL. For example, the first power voltage may be greater than the second power voltage.

Figure 3:
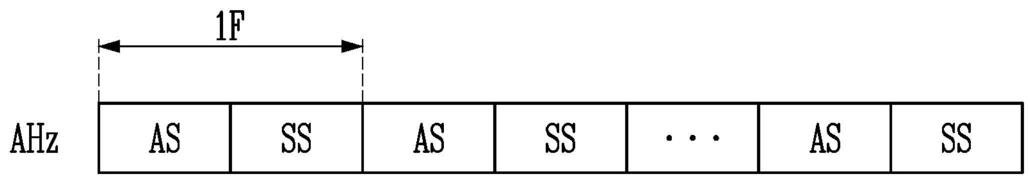
FIG. 3 is a diagram for describing a first mode in accordance with one or more embodiments of the present disclosure.
Figure 4:
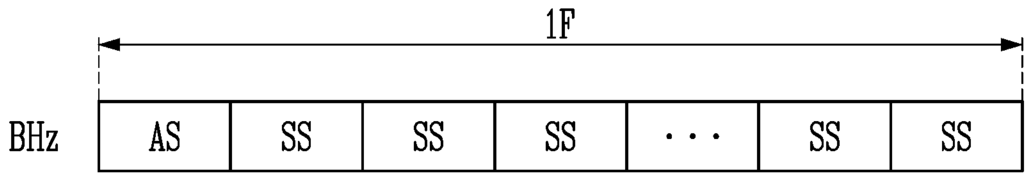
FIG. 4 is a diagram for describing a second mode in accordance with one or more embodiments of the present disclosure.

FIG. 3 is a diagram for describing a first mode in accordance with one or more embodiments of the present disclosure. FIG. 4 is a diagram for describing a second mode in accordance with one or more embodiments of the present disclosure.

The display device 10 may support variable refresh rate (VRR). The term "refresh rate" refers to a frequency at which data voltage is written to the pixel PXij, and may also be referred to as a screen scanning rate or a screen refresh rate, and may represent the number of image frames played per second.

For example, the pixel component 14 may display images at a first frequency AHz in the first mode (refer to FIG. 3), and may display images at a second frequency BHz that is less than the first frequency AHz in the second mode (refer to FIG. 4).

For example, in the first mode, each frame period 1F may include one first scan period AS and one second scan period SS. For example, in the second mode, each frame period 1F may include one first scan period AS and a plurality of second scan periods SS. As the second frequency BHz decreases, the number of second scan periods SS included in the frame period 1F may increase. In another example, in a third mode, each frame period 1F may include only one first scan period AS, and may not include any second scan period SS.

The first scan period AS may be a period in which a data voltage is written to the pixel PXij, and may be referred to as an address scan period. The first scan period AS may also be referred to as a data programming period in which a data voltage is received from the data line DLj.

The second scan period SS may be a period in which a data voltage is not written to the pixel PXij, and may be referred to as a self-scan period. During an emission period of the second scan period SS, the pixel PXij may emit light using the data voltage written during the first scan period AS. The length of the second scan period SS may be the same as the length of the first scan period AS.

Figure 5:
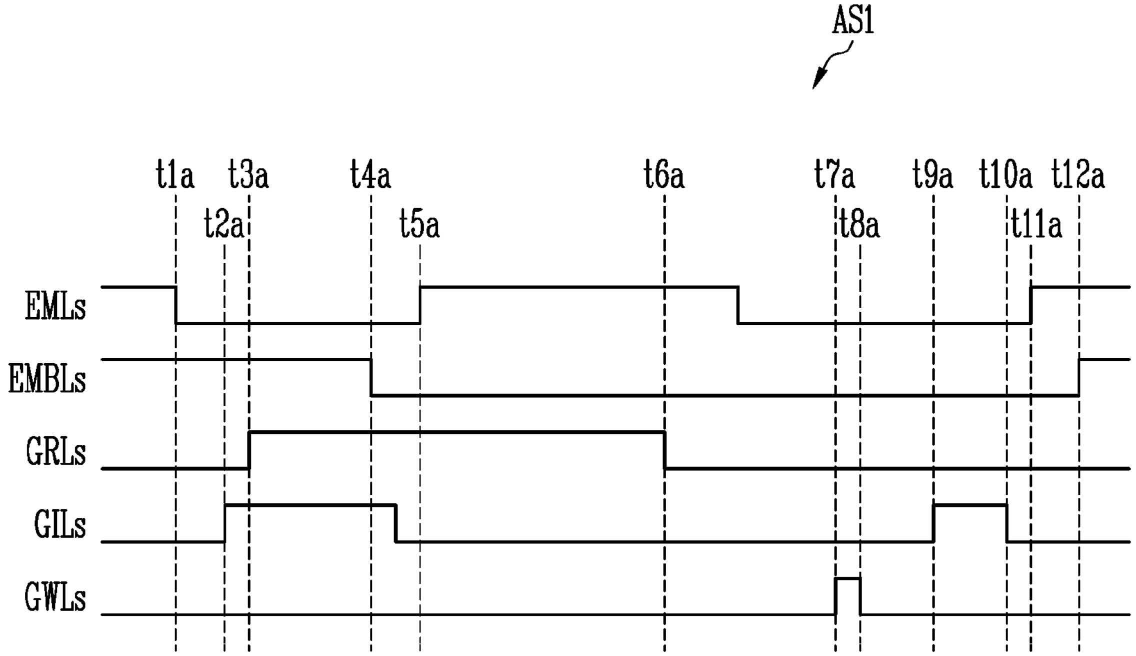
FIG. 5 is a diagram for describing a first scan period in accordance with one or more embodiments of the present disclosure.

FIG. 5 is a diagram for describing a first scan period AS1 in accordance with one or more embodiments of the present disclosure.

The first scan period AS1 of FIG. 5 is an example of the first scan period AS of FIGS. 3 and 4. The first scan period AS1 may sequentially include a second period P2, a third period P3, a fourth period P4, and a first period P1. The following description is based on the pixel rows coupled (e.g., connected) to the i-th scan lines GWLi, GRLi, GILi, EMLi, and EMBLi.

First, a scan signal EMLs of a turn-off level (e.g., a low level) may be applied to the fourth scan line EMLi at time point t1*a*. Hence, the fifth transistor T5 is turned off, and an emission period based on the data voltage written during a previous frame period is terminated.

Next, a scan signal GILs of a turn-on level (e.g., a high level) is applied to the third scan line GILi at time point t2*a*, thus allowing the fourth transistor T4 to be turned on. Hence, the initialization voltage VINT may be applied to the third node N3. Therefore, a voltage at opposite ends of the light-emitting element LD may be initialized. Here, because the sixth transistor T6 is in a turn-on state, the initialization voltage VINT may also be applied to the second node N2. Therefore, a voltage at opposite ends of the first transistor T1 may be initialized.

Next, a scan signal GRLs of a turn-on level may be applied to the second scan line GRLi at time point t3*a*, thus allowing the third transistor T3 to be turned on. Hence, the reference voltage VREF may be applied to the first node N1. Therefore, a voltage at opposite ends of the first capacitor C1 may be initialized.

The second period (P2: t3*a* to t4*a*) may be a period during which scan signals GWLs and EMLs of a turn-off level are applied to the first scan line GWLi and the fourth scan line EMLi, while scan signals GRLs, GILs, and EMBLs of a turn-on level are applied to the second scan line GRLi, the third scan line GILi, and the fifth scan line EMBLi. During the second period P2, the process of coupling (e.g., connecting) one end of the first capacitor C1 included in the pixel PXij and the anode of the light-emitting element LD to the same initialization voltage source may be performed. For example, the process (the second period P2) of coupling (e.g., connecting) the one end of the first capacitor C1 and the anode of the light-emitting element LD to the same initialization voltage source may be performed during a time period that is longer than that of the process (the first period P1) of coupling (e.g., connecting) only the anode of the light-emitting element LD to the initialization voltage source (e.g., of coupling the anode of the light-emitting element LD to the initialization voltage source while the sixth transistor T6 is turned off).

Next, a scan signal EMLs of a turn-on level may be applied to the fourth scan line EMLi at time point t5*a*, thus allowing the fifth transistor T5 to be turned on. The third period (P3: t5*a* to t6*a*) may be a period during which scan signals GWLs, GILs, and EMBLs of a turn-off level are applied to the first scan line GWLi, the third scan line GILi, and the fifth scan line EMBLi, while scan signals GRLs and EMLs of a turn-on level are applied to the second scan line GRLi and the fourth scan line EMLi.

During the third period P3, a voltage of the one end of the first capacitor C1 may increase to correspond to the threshold voltage of the first transistor T1. As described above, the voltage at the opposite ends of the first capacitor C1 has been initialized, and at time point t5*a*, the first capacitor C1 may be maintained in a state where a voltage difference between the gate electrode (the first node N1) and the source electrode (the second node N2) of the first transistor T1 is higher than the threshold voltage of the first transistor T1. Therefore, at time point t5*a*, the first transistor T1 may remain turned on. Here, the voltage of the second node N2 may gradually increase as current is supplied from the first power line ELVDDL through the fifth transistor T5 and the first transistor T1 that are turned on. If the voltage difference between the gate electrode (the first node N1) and the source electrode (the second node N2) of the first transistor T1 reaches the threshold voltage of the first transistor T1, the first transistor T1 may be turned off, and the voltage of the second node N2 may be maintained. Hence, after the third period P3, the first capacitor C1 may store a voltage corresponding to the threshold voltage of the first transistor T1. For example, the process (the third period P3) of increasing the voltage of the one end of the first capacitor C1 may be performed during a time period longer than that of the process (the second period P2) of coupling (e.g., connecting) the one end of the first capacitor C1 and the anode of the light-emitting element LD to the same initialization voltage source.

Next, a scan signal GWLs of a turn-on level may be applied to the first scan line GWLi at time point t7*a*, thus allowing the second transistor T2 to be turned on. In this case, the data voltage may be applied to the data line DLj, thus allowing the data voltage to be written to the first node N1. The voltage of the second node N2 may vary depending on a capacitance ratio of the capacitors C1 and C2 and the threshold voltage of the first transistor T1.

The fourth period (P4: t7*a* to t8*a*) may be a period during which a scan signal GWLs of a turn-on level is applied to the first scan line GWLi, while scan signals GRLs, GILs, EMLs, and EMBLs of a turn-off level are applied to the second scan line GRLi, the third scan line GILi, the fourth scan line EMLi, and the fifth scan line EMBLi. During the fourth period P4, the process of applying the data voltage to a counter end of the first capacitor C1 (e.g., to the first node N1) may be performed. For example, the process (the fourth period P4) of applying the data voltage to the counter end of the first capacitor C1 may be performed during a time period shorter than that of the process (the first period P1) of coupling (e.g., connecting) only the anode of the light-emitting element LD to the initialization voltage source.

Next, a scan signal GILs of a turn-on level may be applied to the third scan line GILi at time point t9*a*, thus allowing the fourth transistor T4 to be turned on. Therefore, by initializing the anode voltage of the light-emitting element LD, it becomes possible to effectively express low grayscale images, such as black grayscale images.

The first period (P1: 19*a* to t10*a*) may be a period during which, while the scan signal GILs of a turn-on level is applied to the third scan line GILi, scan signals GWLs, GRLs, EMLs, and EMBLs of a turn-off level are applied to the first scan line GWLi, the second scan line GRLi, the fourth scan line EMLi, and the fifth scan line EMBLi. During the first period P1, the process of coupling (e.g., connecting) only the anode of the light-emitting element LD to the initialization voltage source may be performed. For example, during the first period P1, the fourth transistor T4 may be in a turned on state while the sixth transistor T6 is in a turned off state such that an electrode (e.g., an anode) of the light-emitting element LD may be electrically coupled (e.g., electrically connected) to the initialization voltage source while the first capacitor C1 and/or the second node N2 are electrically disconnected (e.g., electrically decoupled) from the initialization voltage source. Here, the one end of the first capacitor C1 may be in a state to be insulated from the initialization voltage source. In one or more embodiments, a voltage at the one end of the first capacitor C1 and/or a voltage at the second node N2 may be independent of (e.g., may be substantially unaffected by) the initialization voltage VINT during the first period P1. For example, the voltage at the one end of the first capacitor C1 and/or at the second node N2 may be substantially unchanged during the first period P1 and/or may be different from the initialization voltage VINT during the first period P1.

During the first period P1, the anode (the third node N3) of the light-emitting element LD is initialized, but the second node N2 is not initialized because the sixth transistor T6 is in a turn-off state. If the sixth transistor T6 were in a turn-on state, with the second node N2 coupled (e.g., connected) to the initialization voltage source, unnecessary power would have been consumed due to charging of the first capacitor C1 and the second capacitor C2. Therefore, a reduction in power consumption is possible. Undesirable stripes, which may be attributable to a reduction of the initialization voltage VINT, may be prevented from occurring, or the likelihood of such stripes occurring may be reduced.

At time point t11*a*, a scan signal EMLs of a turn-on level may be applied to the fourth scan line EMLi, thus allowing the fifth transistor T5 to be turned on. Hence, the first electrode of the first transistor T1 may be coupled (e.g., connected) to the first power line ELVDDL.

Subsequently, at time point t12*a*, a scan signal EMLs of a turn-on level may be applied to the fifth scan line EMBLi, thus allowing the sixth transistor T6 to be turned on. Hence, the first transistor T1 may be coupled (e.g., connected) to the anode of the light-emitting element LD.

Because the sixth transistor T6 is turned on at time point t12*a*, with the voltage of the second node N2 increased at time point t11*a*, a higher voltage may be applied to the anode of the light-emitting element LD. Therefore, the emission delay can be prevented or reduced. Further, a relatively high voltage of the second node N2 may be applied to the third node N3, thus preventing emission of the light-emitting element LD from being delayed, or such delay may be reduced.

Figure 6:
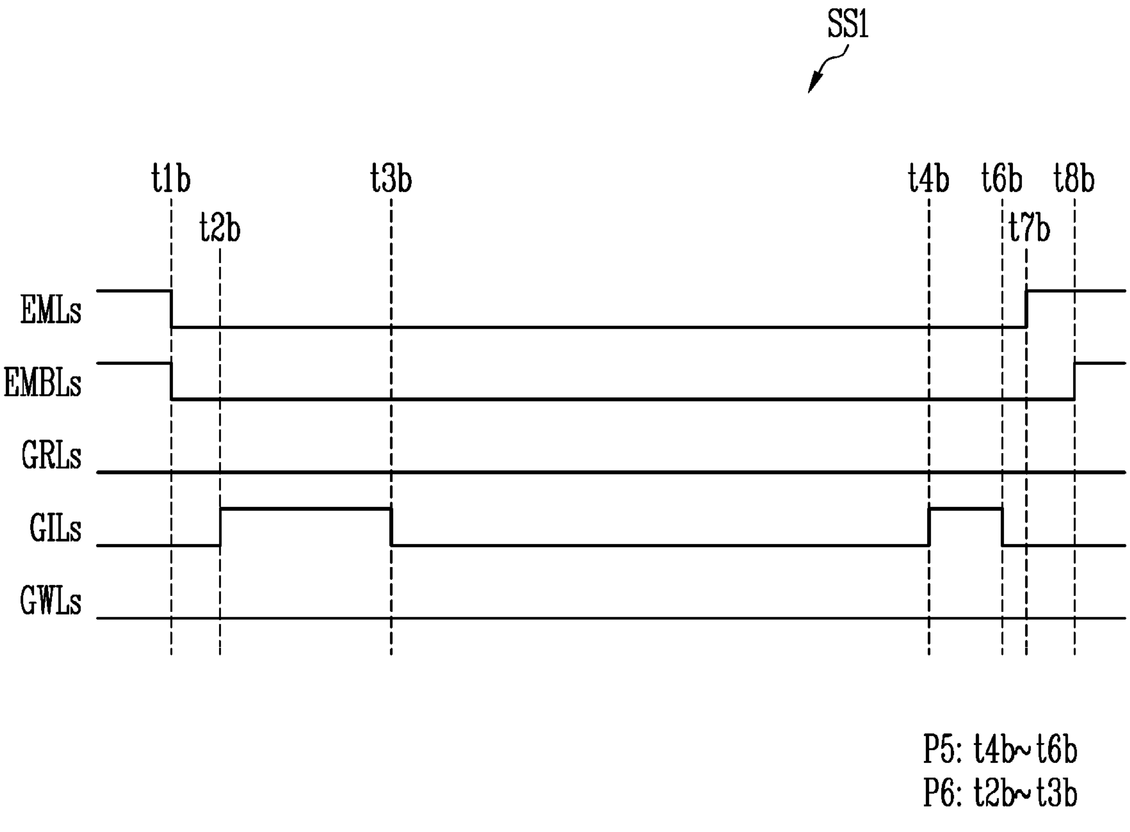
FIG. 6 is a diagram for describing a second scan period in accordance with one or more embodiments of the present disclosure.

FIG. 6 is a diagram for describing a second scan period SS1 in accordance with one or more embodiments of the present disclosure.

The second scan period SS1 of FIG. 6 is an example of the second scan period SS of FIGS. 3 and 4. The second scan period SS1 may sequentially include a sixth period P6 and a fifth period P5. For example, the length of the sixth period P6 may be greater than the length of the fifth period P5.

At time point t1*b* before the sixth period (P6: t2*b* to t3*b*), scan signals EMLs and EMBLs of a turn-off level may be applied to the fourth scan line EMLi and the fifth scan line EMBLi, thus allowing the fifth transistor T5 and the sixth transistor T6 to be turned off.

The sixth period P6 may be a period during which, while a scan signal GILs of a turn-on level is applied to the third scan line GILi, scan signals GWLs, GRLs, EMLs, and EMBLs of a turn-off level are applied to the first scan line GWLi, the second scan line GRLi, the fourth scan line EMLi, and the fifth scan line EMBLi. Hence, during the sixth period P6, a first process where the one end of the first capacitor C1 remains disconnected (e.g., decoupled) from the initialization voltage source may be performed during the process of coupling (e.g., connecting) only the anode of the light-emitting element LD to the initialization voltage source. For example, during the sixth period P6, the fourth transistor T4 may be in a turned on state while the sixth transistor T6 is in a turned off state such that an electrode (e.g., an anode) of the light-emitting element LD may be electrically coupled (e.g., electrically connected) to the initialization voltage source while the first capacitor C1 and/or the second node N2 are electrically disconnected (e.g., electrically decoupled) from the initialization voltage source. In one or more embodiments, a voltage at the one end of the first capacitor C1 and/or a voltage at the second node N2 may be independent of (e.g., may be substantially unaffected by) the initialization voltage VINT during the sixth period P6. For example, the voltage at the one end of the first capacitor C1 and/or at the second node N2 may be substantially unchanged during the sixth period and/or may be different from the initialization voltage VINT during the sixth period P6.

Likewise, the fifth period (P5: t4*b* to t6*b*) may be a period during which, while a scan signal GILs of a turn-on level is applied to the third scan line GILi, scan signals GWLs, GRLs, EMLs, and EMBLs of a turn-off level are applied to the first scan line GWLi, the second scan line GRLi, the fourth scan line EMLi, and the fifth scan line EMBLi. Hence, during the fifth period P5, a second process where the one end of the first capacitor C1 remains disconnected (e.g., decoupled) from the initialization voltage source may be performed during the process of coupling (e.g., connecting) only the anode of the light-emitting element LD to the initialization voltage source. For example, during the fifth period P5, the fourth transistor T4 may be in a turned on state while the sixth transistor T6 is in a turned off state such that an electrode (e.g., an anode) of the light-emitting element LD may be electrically coupled (e.g., electrically connected) to the initialization voltage source, while the first capacitor C1 and/or the second node N2 are electrically disconnected (e.g., electrically decoupled) from the initialization voltage source. In one or more embodiments, a voltage at the one end of the first capacitor C1 and/or a voltage at the second node N2 may be independent of (e.g., may be substantially unaffected by) the initialization voltage VINT during the fifth period P5. For example, the voltage at the one end of the first capacitor C1 and/or at the second node N2 may be substantially unchanged during the fifth period P5 and/or may be different from the initialization voltage VINT during the fifth period P5.

At time point t7*b* after the second process, a scan signal EMLs of a turn-on level may be applied to the fourth scan line EMLi, thus allowing the fifth transistor T5 to be turned on. Hence, at time point t7*b*, the process of coupling (e.g., connecting) the first transistor T1 to the first power line ELVDDL may be performed.

Subsequently, at time point t8*b*, a scan signal EMBLs of a turn-on level may be applied to the fifth scan line EMBLi, thus allowing the sixth transistor T6 to be turned on. Hence, at time point t8*b*, the process of coupling (e.g., connecting) the first transistor T1 to the anode of the light-emitting element LD may be performed.

The effects obtained in each of the sixth period P6 and the fifth period P5 may be substantially the same as those obtained in the first period P1 of FIG. 5. Furthermore, the effects obtained at time points t7*b* and t8*b* may be substantially the same as those obtained at time points t11*a* and t12*a*. Therefore, redundant explanations pertaining to the previous statement may not be repeated.

Figure 7:
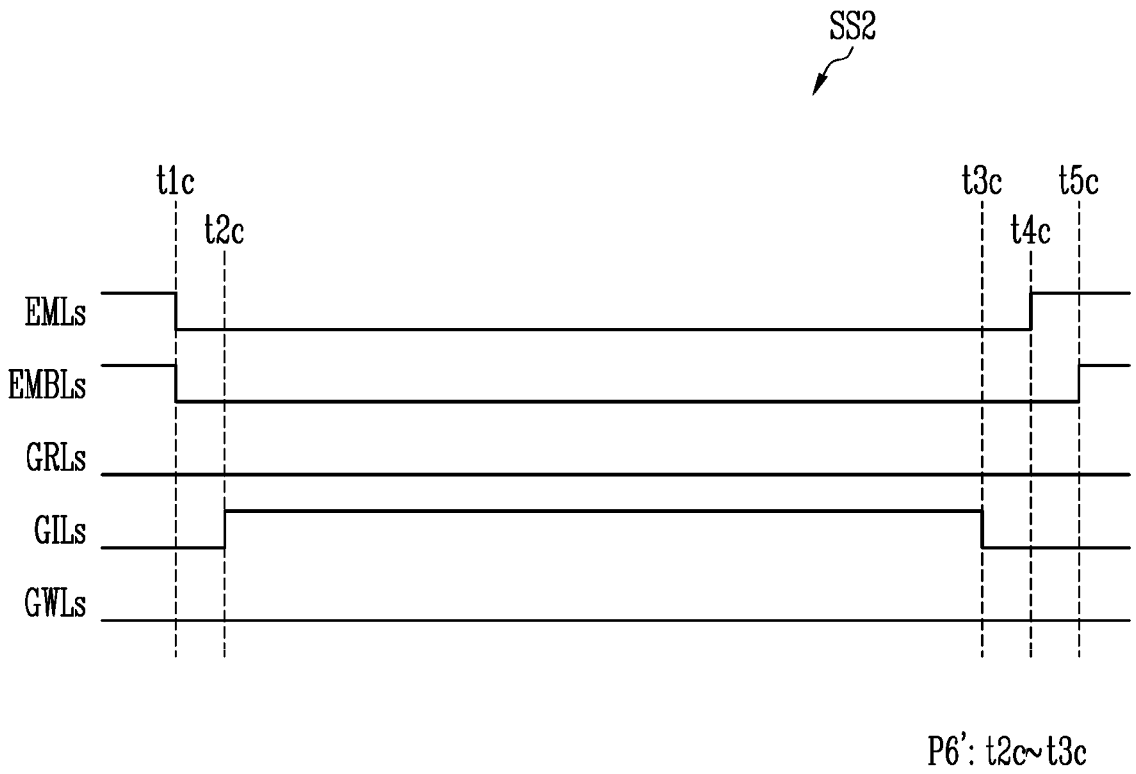
FIG. 7 is a diagram for describing a second scan period in accordance with one or more other embodiments of the present disclosure.

FIG. 7 is a diagram for describing a second scan period SS2 in accordance with one or more other embodiments of the present disclosure. The second scan period SS2 of FIG. 7 is an example of the second scan period SS of FIGS. 3 and 4.

During the second scan period SS2 of FIG. 7, subsequent processes may be sequentially performed. First, at time point t1*c*, the process of concurrently (e.g., simultaneously) disconnecting (e.g., decoupling) the connection between the first power line ELVDDL and the first transistor T1 and the connection between the first transistor T1 and the light-emitting element LD may be performed. Subsequently, at time point t2*c*, the process where the one end of the first capacitor C1 remains disconnected (e.g., decoupled) from the initialization voltage source may be performed during the process of coupling (e.g., connecting) only the anode of the light-emitting element LD to the initialization voltage source. At time point t4*c*, the process of coupling (e.g., connecting) the first transistor T1 to the first power line ELVDDL may be performed. Thereafter, at time point t5*c*, the process of coupling (e.g., connecting) the first transistor T1 to the anode of the light-emitting element LD may be performed.

Aspects of a sixth period (P6': t2*c* to t3*c*) of FIG. 7 may be substantially the same as those obtained in the sixth period P6 and the fifth period P5 of FIG. 6. Furthermore, the effects obtained at time points t4*c* and t5*c* may be substantially the same as those obtained at time points t7*b* and t8*b*. Therefore, redundant explanations pertaining to the previous statement may not be repeated.

FIGS. 8 to 15 are sectional views illustrating the structure of a light-emitting element LD in accordance with embodiments of the present disclosure. Hereinafter, the light-emitting element LD is assumed to be formed of an organic light-emitting diode OLED.

Figure 8:
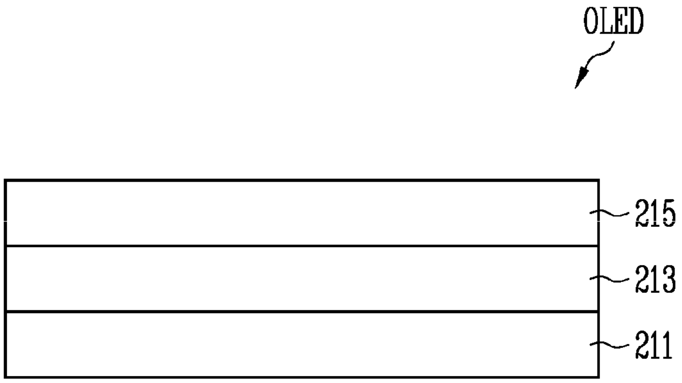
FIGS. 8 to 15 are sectional views illustrating the structure of a light-emitting element in accordance with embodiments of the present disclosure.

Referring to FIG. 8, the organic light-emitting diode OLED may include a pixel electrode 211, a counter electrode 215, and an intermediate layer 213 between the pixel electrode 211 (or a first electrode, or an anode) and the counter electrode 215 (or a second electrode, or a cathode).

The pixel electrode 211 may include (e.g., may be) transparent conductive oxide, such as indium tin oxide (ITO), zinc oxide (IZO), zinc oxide (ZnO), indium oxide ($In_2O_3$), indium gallium oxide (IGO), and/or aluminum zinc oxide (AZO). The pixel electrode 211 may include a reflective layer including (e.g., being) silver (Ag), magnesium (Mg), aluminum (Al), platinum (Pt), palladium (Pd), gold (Au), nickel (Ni), neodymium (Nd), iridium (Ir), chromium (Cr), or compounds thereof. For example, the pixel electrode 211 may have a triple-layer structure including ITO/Ag/ITO.

The counter electrode 215 may be on (e.g., located on, or above) the intermediate layer 213. The counter electrode 215 may include (e.g., may be) a low work function metal, alloy, electrically conductive compound, or any combination thereof. For example, the counter electrode 215 may include (e.g., may be) lithium (Li), silver (Ag), magnesium (Mg), aluminum (Al), aluminum-lithium (Al—Li), calcium (Ca), magnesium-indium (Mg—In), magnesium-silver (Mg—Ag), ytterbium (Yb), silver-ytterbium (Ag—Yb), ITO, IZO, or any combination thereof. The counter electrode 215 may be a transparent electrode, a semi-transparent electrode, or a reflective electrode.

The intermediate layer 213 may include (e.g., may be) high molecular and/or low molecular organic material that emits light of a corresponding color. The intermediate layer 213 may further include a metal-containing compound, such as an organic metal compound, and/or an inorganic material, such as quantum dots, in addition to various suitable organic materials.

In one or more embodiments, the intermediate layer 213 may include one emission layer, and a first functional layer and a second functional layer that are respectively provided under and over the emission layer. The first functional layer may include, for example, a hole transport layer (HTL) and/or a hole injection layer (HIL). The second functional layer may include, for example, an electron transport layer (ETL) and/or an electron injection layer (EIL). The first functional layer and/or the second functional layer may be omitted. The first functional layer and the second functional layer may be integrally formed to correspond to a plurality of organic light-emitting diodes OLED included in the pixel component 14.

In one or more embodiments, the intermediate layer 213 may include a charge generation layer CGL between (e.g., located between) two or more emission units that are successively stacked between the pixel electrode 211 and the counter electrode 215. In the case where the intermediate layer 213 includes the emission units and the charge generation layer CGL, the organic light-emitting diode OLED may be a tandem light-emitting element. The organic light-emitting diode OLED may have a stack structure including a plurality of emission units, thus enhancing color purity and light-emitting efficiency.

One emission unit may include an emission layer, and a first functional layer and a second functional layer that are respectively provided under and over the emission layer. The charge generation layer CGL may include a negative charge generation layer and/or a positive charge generation layer. The negative charge generation layer and the positive charge generation layer may further enhance the light-emitting efficiency of the light-emitting diode OLED that is a tandem light-emitting element including a plurality of emission layers.

The negative charge generation layer may be an n-type charge generation layer. The negative charge generation layer may supply electrons. The negative charge generation layer may include (e.g., may be) a host material and a dopant. The host material may include (e.g., may be) an organic material. The dopant may include (e.g., may be) a metal material. The positive charge generation layer may be a p-type charge generation layer. The positive charge generation layer may supply holes. The positive charge generation layer may include (e.g., may be) a host material and a dopant. The host material may include (e.g., may be) an organic material. The dopant may include (e.g., may be) a metal material.

Figure 9:
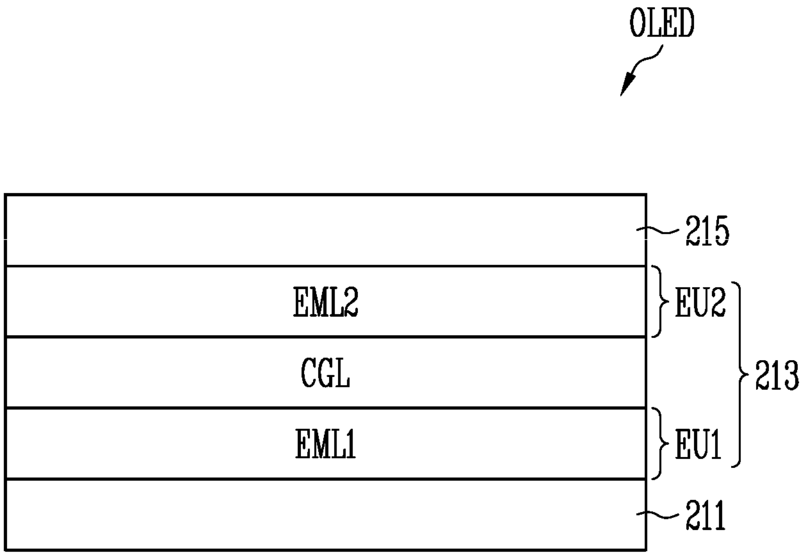

In one or more embodiments, as illustrated in FIG. 9, the organic light-emitting diode OLED may include a first emission unit EU1 including a first emission layer EML1, and a second emission unit EU2 including a second emission layer EML2, where the first emission unit EU1 and the second emission unit EU2 are successively stacked. The charge generation layer CGL may be provided between the first emission unit EU1 and the second emission unit EU2. For example, the organic light-emitting diode OLED may include the pixel electrode 211, the first emission layer EML1, the charge generation layer CGL, the second emission layer EML2, and the counter electrode 215 that are successively stacked. A first functional layer and/or a second functional layer may be respectively provided under and over the first emission layer EML1. A first functional layer and/or a second functional layer may be respectively provided under and/or over the second emission layer EML2. The first emission layer EML1 may be a blue emission layer. The second emission layer EML2 may be a yellow emission layer.

Figure 10:
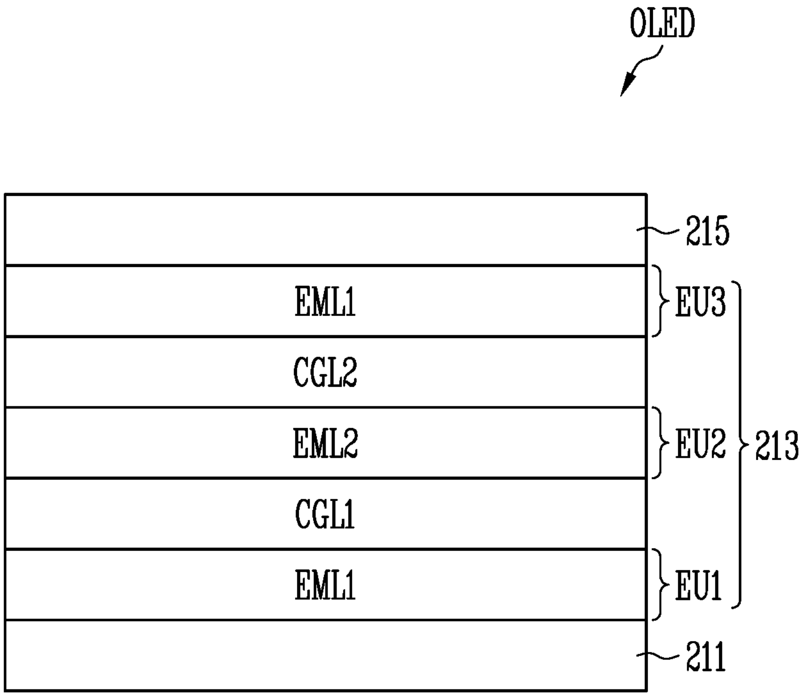

In one or more embodiments, as illustrated in FIG. 10, the organic light-emitting diode OLED may include a first emission unit EU1 and a third emission unit EU3 each including a first emission layer EML1, and a second emission unit EU2 including a second emission layer EML2. A first charge generation layer CGL1 may be provided between the first emission unit EU1 and the second emission unit EU2. A second charge generation layer CGL2 may be provided between the second emission unit EU2 and the third emission unit EU3. For example, the organic light-emitting diode OLED may include the pixel electrode 211, the first emission layer EML1, the first charge generation layer CGL1, the second emission layer EML2, the second charge generation layer CGL2, the first emission layer EML1, and the counter electrode 215 that are successively stacked. A first functional layer and/or a second functional layer may be respectively provided under and over the first emission layer EML1 (e.g., the first emission layer EML1 of the first emission unit EU1, the first emission layer EML1 of the third emission unit EU3, or each of the first emission layer EML1 of the first emission unit EU1 and the first emission layer EML1 of the third emission unit EU3). A first functional layer and/or a second functional layer may be respectively provided under and over the second emission layer EML2. The first emission layer EML1 may be a blue emission layer. The second emission layer EML2 may be a yellow emission layer.

In one or more embodiments, in the organic light-emitting diode OLED, the second emission unit EU2 may further include a third emission layer EML3 and/or a fourth emission layer EML4 that directly contacts the second emission layer EML2 under and/or over the second emission layer EML2, in addition to the second emission layer EML2. Here, the term "directly contact" may mean there are no other layers between the second emission layer EML2 and the third emission layer EML3 and/or between the second emission layer EML2 and the fourth emission layer EML4. The third emission layer EML3 may be a red emission layer. The fourth emission layer EML4 may be a green emission layer.

Figure 11:
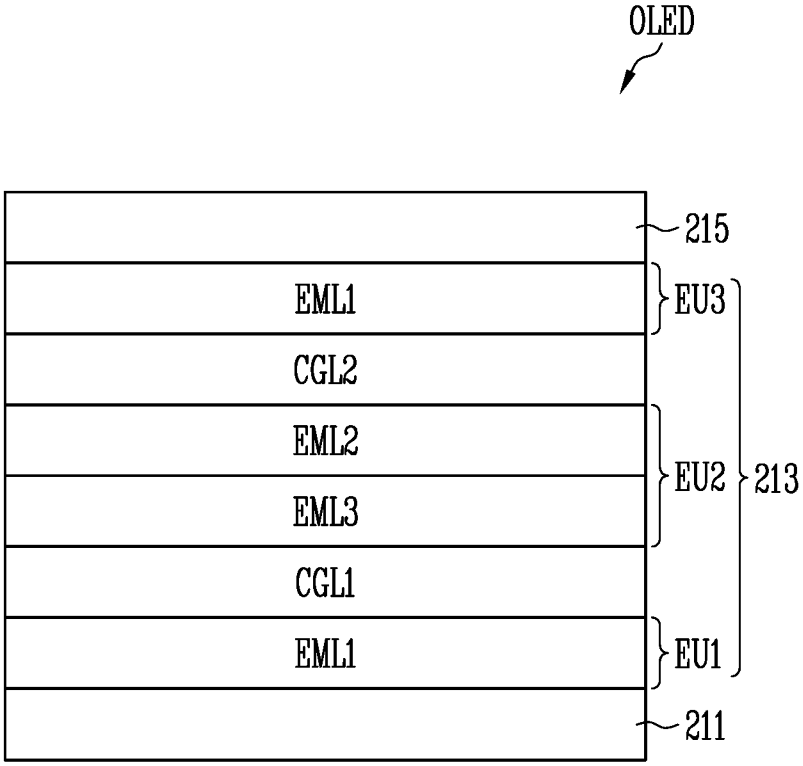
Figure 12:
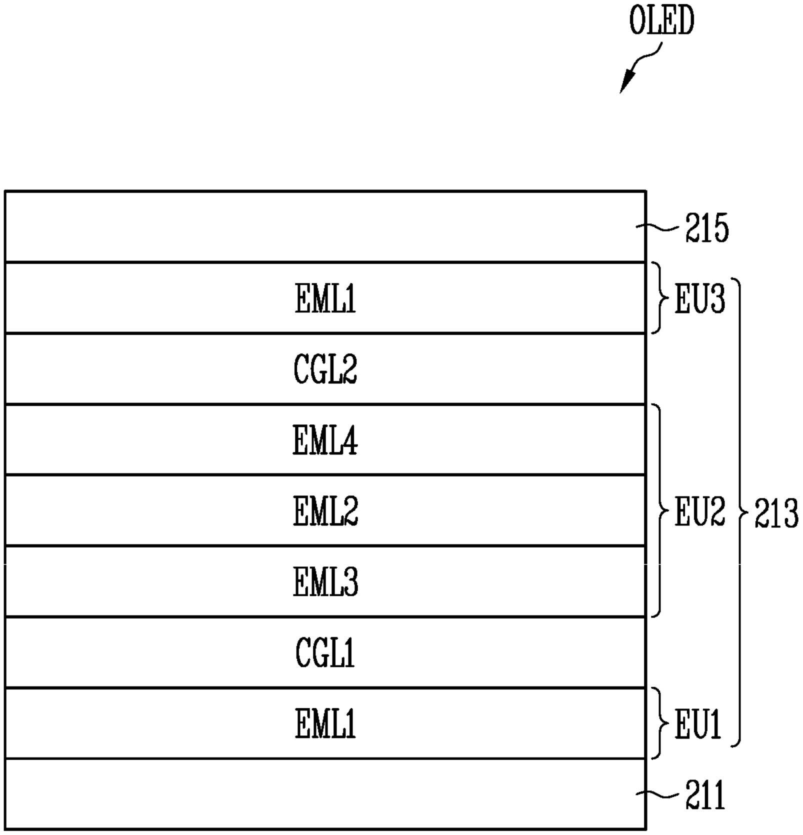

For example, as illustrated in FIG. 11, the organic light-emitting diode OLED may include the pixel electrode 211, the first emission layer EML1, the first charge generation layer CGL1, the third emission layer EML3, the second emission layer EML2, the second charge generation layer CGL2, the first emission layer EML1, and the counter electrode 215 that are successively stacked. In one or more embodiments, as illustrated in FIG. 12, the organic light-emitting diode OLED may include the pixel electrode 211, the first emission layer EML1, the first charge generation layer CGL1, the third emission layer EML3, the second emission layer EML2, the fourth emission layer EML4, the second charge generation layer CGL2, the first emission layer EML1, and the counter electrode 215 that are successively stacked.

Figure 13:
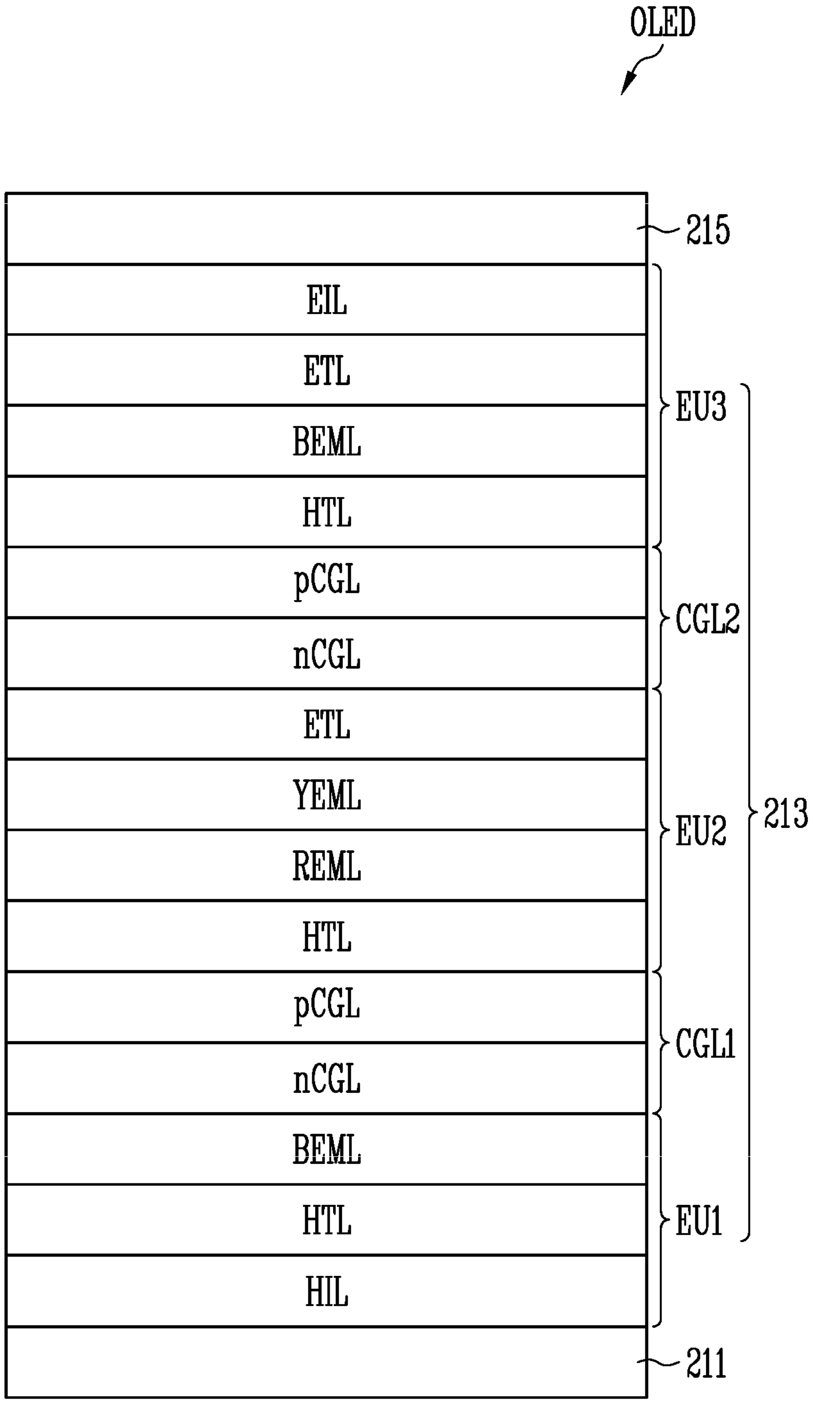
Figure 14:
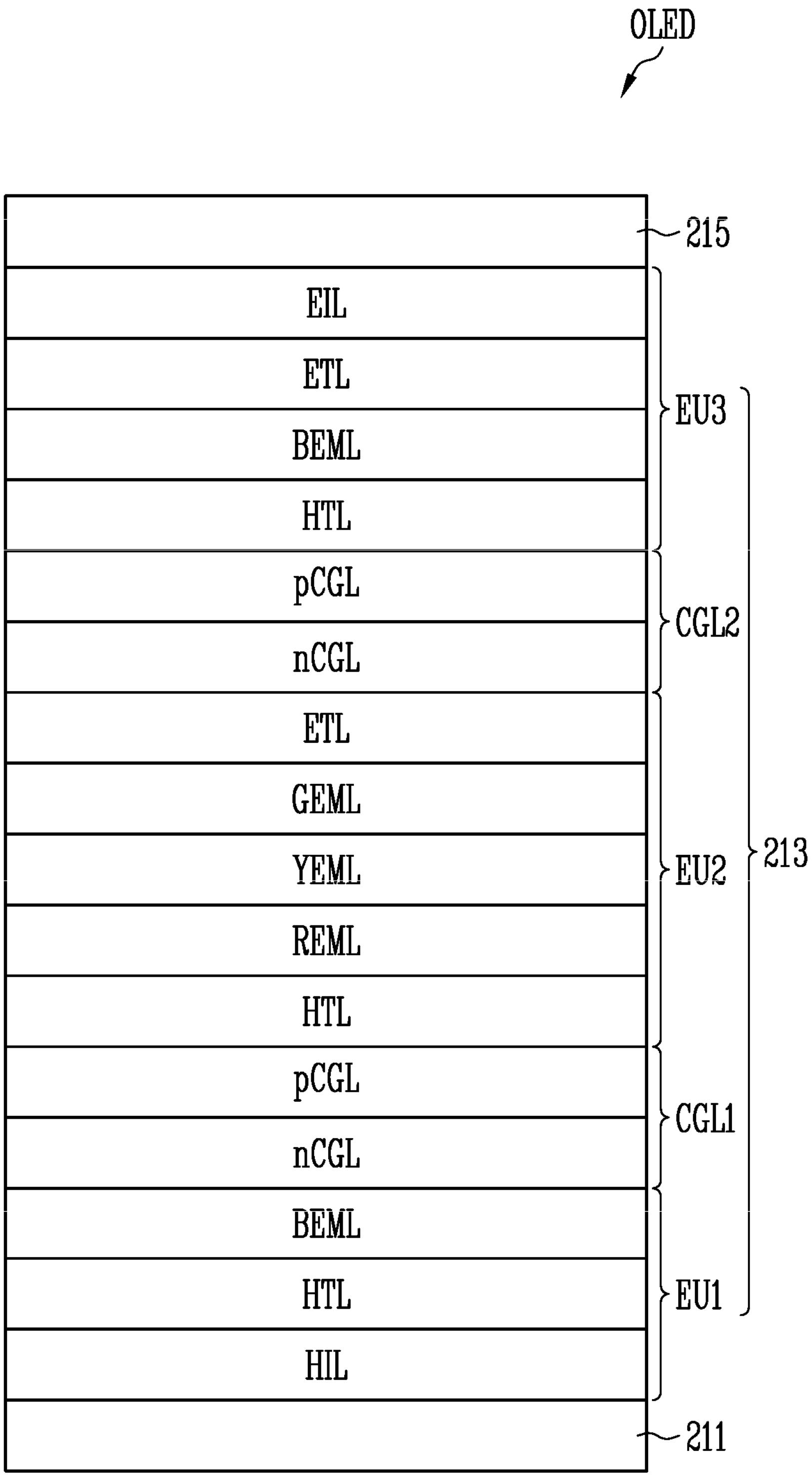

FIG. 13 is a sectional view illustrating an example of an organic light-emitting diode OLED of FIG. 11. FIG. 14 is a sectional view illustrating an example of an organic light-emitting diode OLED of FIG. 12.

Referring to FIG. 13, the organic light-emitting diode OLED may include a first emission unit EU1, a second emission unit EU2, and a third emission unit EU3 that are successively stacked. A first charge generation layer CGL1 may be provided between the first emission unit EU1 and the second emission unit EU2. A second charge generation layer CGL2 may be provided between the second emission unit EU2 and the third emission unit EU3. The first charge generation layer CGL1 and the second charge generation layer CGL2 may each include a negative charge generation layer nCGL and a positive charge generation layer pCGL. In one or more embodiments, the first charge generation layer CGL1 may include a negative charge generation layer nCGL and a positive charge generation layer pCGL, and the second charge generation layer CGL2 may include a negative charge generation layer nCGL and a positive charge generation layer pCGL.

The first emission unit EU1 may include a blue emission layer BEML. The first emission unit EU1 may further include a hole injection layer HIL and a hole transport layer HTL that are provided between the pixel electrode 211 and the blue emission layer BEML. In one or more embodiments, a p-type doping layer may be further included between the hole injection layer HIL and the hole transport layer HTL. The p-type doping layer may be formed by doping the hole injection layer HIL with a p-type doping material. In one or more embodiments, at least one of a blue light-emitting assistant layer, an electron-blocking layer, or a buffer layer may be further included between the blue emission layer BEML and the hole transport layer HTL. The blue light-emitting assistant layer may increase light-emitting efficiency of the blue emission layer BEML. The blue light-emitting assistant layer may adjust hole charge balance, thus enhancing the light-emitting efficiency of the blue emission layer BEML. The electron-blocking layer may prevent, reduce, or block electrons from being injected into the hole transport layer HTL. The buffer layer may compensate for a resonance distance depending on the wavelength of light emitted from the emission layer.

The second emission unit EU2 may include a yellow emission layer YEML, and a red emission layer REML that directly contacts the yellow emission layer YEML under the yellow emission layer YEML. The second emission unit EU2 may further include a hole transport layer HTL between the positive charge generation layer pCGL of the first charge generation layer CGL1 and the red emission layer REML, and may further include an electron transport layer ETL between the yellow emission layer YEML and the negative charge generation layer nCGL of the second charge generation layer CGL2.

The third emission unit EU3 may include a blue emission layer BEML. The third emission unit EU3 may further include a hole transport layer HTL between the positive charge generation layer pCGL of the second charge generation layer CGL2 and the blue emission layer BEML. The third emission unit EU3 may further include an electron transport layer ETL and an electron injection layer EIL that are provided between the blue emission layer BEML and the counter electrode 215. The electron transport layer ETL may have a single-layer structure or a multilayer structure. In one or more embodiments, at least one of a blue light-emitting assistant layer, an electron-blocking layer, or a buffer layer may be further included between the blue emission layer BEML and the hole transport layer HTL. At least one of a hole-blocking layer or a buffer layer may be further included between the blue emission layer BEML and the electron transport layer ETL. The hole-blocking layer may prevent, reduce, or block holes from being injected into the electron transport layer ETL.

The stack structure of the second emission unit EU2 in the organic light-emitting diode OLED depicted in FIG. 14 differs from the second emission unit EU2 in the organic light-emitting diode OLED depicted in FIG. 13, while the other configurations remain the same. Referring to FIG. 14, the second emission unit EU2 may include a yellow emission layer YEML, a red emission layer REML that directly contacts the yellow emission layer YEML under the yellow emission layer YEML, and a green emission layer GEML that directly contacts the yellow emission layer YEML over the yellow emission layer YEML. The second emission unit EU2 may further include a hole transport layer HTL between the positive charge generation layer pCGL of the first charge generation layer CGL1 and the red emission layer REML, and may further include an electron transport layer ETL between the green emission layer GEML and the negative charge generation layer nCGL of the second charge generation layer CGL2.

Figure 15:
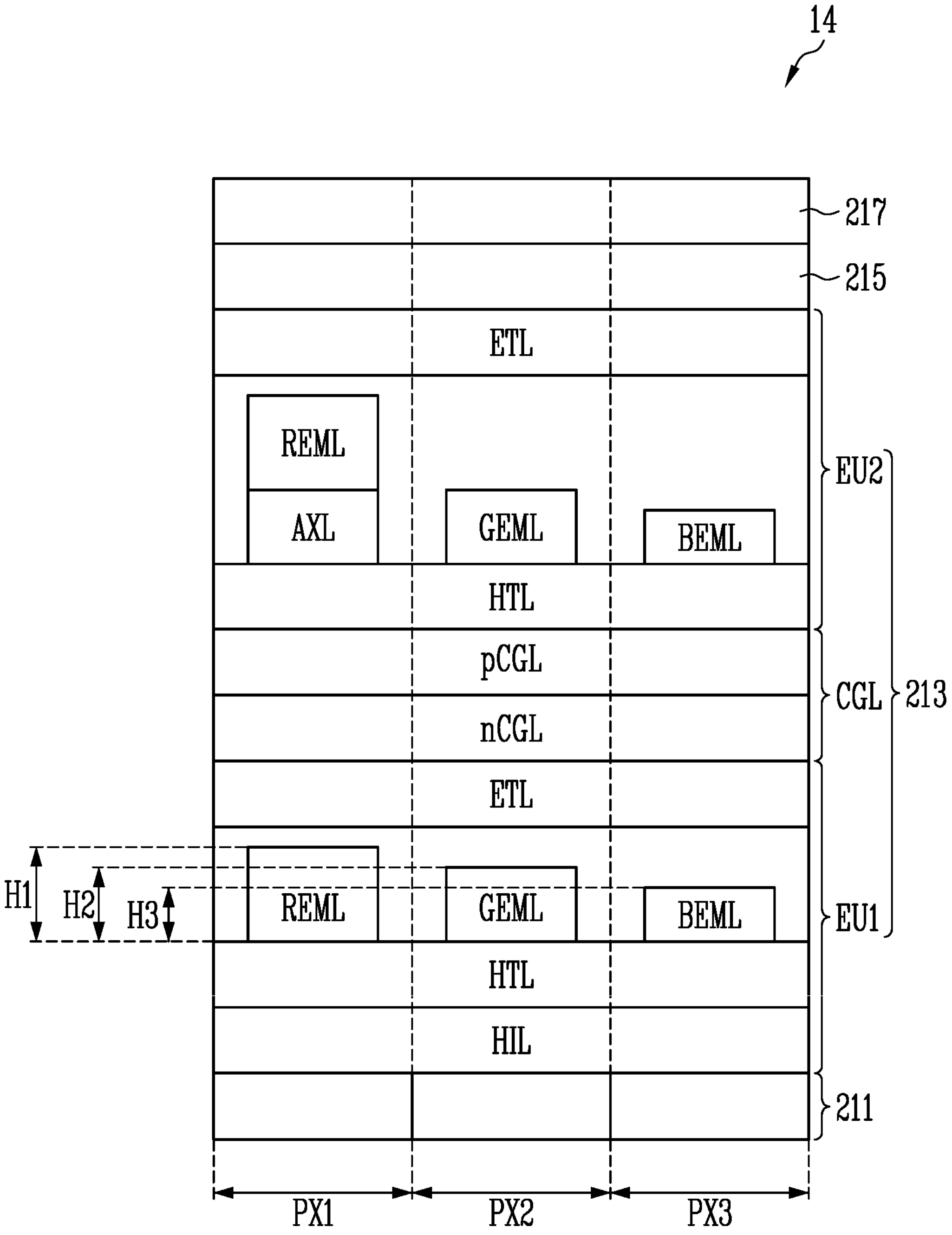

Referring to FIG. 15, the pixel component 14 may include a plurality of pixels. The pixels may include a first pixel PX1, a second pixel PX2, and a third pixel PX3. Each of the first pixel PX1, the second pixel PX2, and the third pixel PX3 may include a pixel electrode 211, a counter electrode 215, and an intermediate layer 213. In one or more embodiments, the first pixel PX1 may be a red pixel, the second pixel PX2 may be a green pixel, and the third pixel PX3 may be a blue pixel. Here, the pixel may include an organic light-emitting diode OLED as a display element. The organic light-emitting diode OLED of each pixel may be electrically coupled (e.g., electrically connected) to a pixel circuit. The pixel electrode 211 may be independently provided in each of the first pixel PX1, the second pixel PX2, and the third pixel PX3.

The intermediate layer 213 of the organic light-emitting diode OLED of each of the first pixel PX1, the second pixel PX2, and the third pixel PX3 may include a first emission unit EU1 and a second emission unit EU2 that are successively stacked, and a charge generation layer CGL provided between the first emission unit EU1 and the second emission unit EU2. The charge generation layer CGL may include a negative charge generation layer nCGL and a positive charge generation layer pCGL. The charge generation layer CGL may be a common layer that is formed continuously over the first pixel PX1, the second pixel PX2, and the third pixel PX3.

The first emission unit EU1 of the first pixel PX1 may include a hole injection layer HIL, a hole transport layer HTL, a red emission layer REML, and an electron transport layer ETL that are successively stacked on the pixel electrode 211.

The first emission unit EU1 of the second pixel PX2 may include a hole injection layer HIL, a hole transport layer HTL, a green emission layer GEML, and an electron transport layer ETL that are successively stacked on the pixel electrode 211.

The first emission unit EU1 of the third pixel PX3 may include a hole injection layer HIL, a hole transport layer HTL, a blue emission layer BEML, and an electron transport layer ETL that are successively stacked on the pixel electrode 211. Each of the hole injection layer HIL, the hole transport layer HTL, and the electron transport layer ETL of the first emission units EU1 may be a common layer that are formed continuously over the first pixel PX1, the second pixel PX2, and the third pixel PX3.

The second emission unit EU2 of the first pixel PX1 may include a hole transport layer HTL, an auxiliary layer AXL, a red emission layer REML, and an electron transport layer ETL that are successively stacked on the charge generation layer CGL.

The second emission unit EU2 of the second pixel PX2 may include a hole transport layer HTL, a green emission layer GEML, and an electron transport layer ETL that are successively stacked on the charge generation layer CGL.

The second emission unit EU2 of the third pixel PX3 may include a hole transport layer HTL, a blue emission layer BEML, and an electron transport layer ETL that are successively stacked on the charge generation layer CGL. Each of the hole transport layer HTL and the electron transport layer ETL of the second emission units EU2 may be a common layer that are formed continuously over the first pixel PX1, the second pixel PX2, and the third pixel PX3. In one or more embodiments, the second emission unit EU2 of each of the first pixel PX1, the second pixel PX2, and the third pixel PX3 may further include at least one of a hole-blocking layer or a buffer layer between the emission layer and the electron transport layer ETL.

A thickness H1 of the red emission layer REML, a thickness H2 of the green emission layer GEML, and a thickness H3 of the blue emission layer BEML may be determined depending on the resonant distance. The auxiliary layer AXL may be a layer added to match the resonant distance, and may include (e.g., may be) resonant assisting materials. For example, the auxiliary layer AXL may include (e.g., may be) the same material as the hole transport layer HTL.

Although FIG. 15 illustrates an example where only the first pixel PX1 includes the auxiliary layer AXL, embodiments of the present disclosure are not limited thereto. For example, the auxiliary layer AXL may be provided in at least one of the first pixel PX1, the second pixel PX2, or the third pixel PX3 so as to match the resonant distance of each of the first pixel PX1, the second pixel PX2, and the third pixel PX3.

The pixel component 14 may further include a capping layer 217 outside (e.g., located outside) the counter electrode 215. The capping layer 217 may function to improve the emission efficiency based on the principle of constructive interference. As a result, the light extraction efficiency of the organic light-emitting diode OLED may be enhanced, thus leading to an improvement in the emission efficiency of the organic light-emitting diode OLED.

A display device and a method of driving the display device in accordance with the present disclosure may minimize or reduce power consumption.

Although embodiments of the present disclosure have been disclosed for illustrative purposes, those skilled in the art will appreciate that various suitable modifications, additions and substitutions are possible, without departing from the scope and spirit of the present disclosure as disclosed in the accompanying claims. Accordingly, the bounds and scope of the present disclosure should be determined by the technical spirit of the following claims and equivalents thereof, with functional equivalents thereof to be included therein.

What is claimed is:

1. A display device comprising a pixel component comprising a plurality of pixels, wherein a pixel of the plurality of pixels comprises:

a first transistor comprising a first gate electrode coupled to a first node, and a second gate electrode coupled to a second node;

a second transistor comprising a gate electrode coupled to a first scan line, a first electrode coupled to a data line, and a second electrode coupled to the first node;

a third transistor comprising a gate electrode coupled to a second scan line, a first electrode configured to receive a reference voltage, and a second electrode coupled to the first node;

a fourth transistor comprising a gate electrode coupled to a third scan line, a first electrode configured to receive an initialization voltage, and a second electrode coupled to a third node;

a fifth transistor comprising a gate electrode coupled to a fourth scan line, a first electrode coupled to a first power line, and a second electrode coupled to a first electrode of the first transistor;

a sixth transistor comprising a gate electrode coupled to a fifth scan line, a first electrode coupled to the second node, and a second electrode coupled to the third node; and a first capacitor between the first node and the second node, wherein, during a first period of a frame period, the display device is configured to concurrently:

apply a scan signal of a turn-on level to the third scan line; and apply scan signals of a turn-off level to the first scan line, the second scan line, the fourth scan line, and the fifth scan line, wherein the pixel component is configured to display an image at a first frequency in a first mode, and to display an image at a second frequency that is less than the first frequency in a second mode, wherein, in the first mode, each frame period comprises a first scan period during which a data voltage is written to the pixel, and a second scan period during which the data voltage is not written to the pixel, wherein, in the second mode, each frame period comprises the first scan period and a plurality of the second scan periods, and wherein the first scan period comprises the first period.

2. The display device according to claim 1, wherein, after the first period, the display device is configured to sequentially apply a scan signal of a turn-on level to the fourth scan line and a scan signal of a turn-on level to the fifth scan line.

3. The display device according to claim 1, wherein the first scan period further comprises a second period during which scan signals of a turn-off level are applied to the first scan line and the fourth scan line, and scan signals of a turn-on level are applied to the second scan line, the third scan line, and the fifth scan line.

4. The display device according to claim 3, wherein the first scan period further comprises a third period during which scan signals of a turn-off level are applied to the first scan line, the third scan line, and the fifth scan line, and scan signals of a turn-on level are applied to the second scan line and the fourth scan line.

5. The display device according to claim 4, wherein the first scan period further comprises a fourth period during which a scan signal of a turn-on level is applied to the first scan line, and scan signals of a turn-off level are applied to the second scan line, the third scan line, the fourth scan line, and the fifth scan line.

6. The display device according to claim 5, wherein the second period, the third period, the fourth period, and the first period occur sequentially in the first scan period.

7. The display device according to claim 6, wherein the second scan period comprises a fifth period during which, while a scan signal of a turn-on level is applied to the third scan line, scan signals of a turn-off level are applied to the first scan line, the second scan line, the fourth scan line, and the fifth scan line.

8. The display device according to claim 7, wherein, after the fifth period, the display device is configured to sequentially apply a scan signal of a turn-on level to the fourth scan line and a scan signal of a turn-on level to the fifth scan line.

9. The display device according to claim 7, wherein the second scan period further comprises a sixth period during which, while a scan signal of a turn-on level is applied to the third scan line, scan signals of a turn-off level are applied to the first scan line, the second scan line, the fourth scan line, and the fifth scan line.

10. The display device according to claim 9, wherein the sixth period and the fifth period occur sequentially in the second scan period.

11. The display device according to claim 9, wherein, before the sixth period, the display device is configured to apply scan signals of a turn-off level to the fourth scan line and the fifth scan line.

12. A method of driving a display device, the method comprising displaying an image at a first frequency in a first mode, and displaying an image at a second frequency that is less than the first frequency in a second mode, wherein, in the first mode, each frame period comprises a first scan period during which a data voltage is written to a pixel, and a second scan period during which the data voltage is not written to the pixel, wherein, in the second mode, each frame period comprises the first scan period and a plurality of the second scan periods, wherein, in the first scan period, the method of driving the display device sequentially comprises:

coupling a first end of a first capacitor in the pixel and an anode of a light-emitting element to a same initialization voltage source;

increasing a voltage of the first end of the first capacitor to correspond to a threshold voltage of a driving transistor in the pixel;

applying a data voltage to a second end of the first capacitor; and coupling the anode of the light-emitting element to the initialization voltage source while the first end of the first capacitor remains electrically disconnected from the initialization voltage source, and wherein, in the first scan period, the method further comprises:

coupling the driving transistor to a first power line; and coupling the driving transistor to the anode of the light-emitting element.

13. The method according to claim 12, wherein a duration of the coupling of the first end of the first capacitor and the anode of the light-emitting element to the same initialization voltage source is longer than a duration of the coupling of the anode of the light-emitting element to the initialization voltage source while the first end of the first capacitor remains electrically disconnected from the initialization voltage source.

14. The method according to claim 12, wherein a duration of the increasing of the voltage of the first end of the first capacitor is longer than a duration of the coupling of the first end of the first capacitor and the anode of the light-emitting element to the same initialization voltage source.

15. The method according to claim 12, wherein a duration of the applying of the data voltage to the second end of the first capacitor is shorter than a duration of the coupling of the anode of the light-emitting element to the initialization voltage source while the first end of the first capacitor remains disconnected from the initialization voltage source.

16. The method according to claim 12, wherein, in the second scan period, the method further comprises:

a first operation of coupling the anode of the light-emitting element to the initialization voltage source while the first end of the first capacitor remains disconnected from the initialization voltage source; and a second operation of coupling the anode of the light-emitting element to the initialization voltage source while the first end of the first capacitor remains disconnected from the initialization voltage source, wherein a duration of the first operation is longer than a duration of the second operation.

17. The method according to claim 16, wherein, in the second scan period, the method further comprises:

coupling the driving transistor to the first power line after the second operation; and coupling the driving transistor to an anode of the light-emitting element.

18. The method according to claim 12, wherein, in the second scan period, the method further comprises:

concurrently disconnecting a connection between the first power line and the driving transistor, and disconnecting a connection between the driving transistor and the anode of the light-emitting element;

coupling only the anode of the light-emitting element to the initialization voltage source while the first end of the first capacitor remains disconnected from the initialization voltage source;

coupling the driving transistor to the first power line; and coupling the driving transistor to the anode of the light-emitting element.

* * * * *